United States Patent [19]

Klinar et al.

[11] Patent Number: 4,741,827

[45] Date of Patent: May 3, 1988

[54] APPARATUS FOR SEPARATING OF LIQUID FILMS FLOATING ON LIQUIDS

[75] Inventors: Gottfried Klinar, Leoben; Vilim Cvitas, Linz, both of Austria

[73] Assignee: Voest-Alpine Aktiengesellschaft, Austria

[21] Appl. No.: 866,283

[22] Filed: May 23, 1986

[30] Foreign Application Priority Data

May 23, 1985 [AT] Austria .................................. 1564/85

[51] Int. Cl.⁴ ............................................. E02B 15/04
[52] U.S. Cl. .................... 210/242.3; 210/923
[58] Field of Search ........................ 210/242.3, 776, 923

[56] References Cited

U.S. PATENT DOCUMENTS

| | | | |
|---|---|---|---|
| 3,338,414 | 8/1967 | Lefke et al. | 210/923 |
| 3,546,112 | 12/1970 | Will et al. | 210/671 |
| 3,578,585 | 5/1971 | Yahnke | 210/671 |
| 3,612,277 | 10/1971 | Van Stavern et al. | 210/776 |
| 3,693,805 | 9/1972 | Tillett et al. | 210/776 |
| 3,905,902 | 9/1975 | Hoegberg et al. | 210/242.3 |
| 4,021,344 | 5/1977 | Webb | 210/242.3 |
| 4,172,036 | 10/1979 | Morris | 210/242.3 |
| 4,360,429 | 11/1982 | Morris | 210/242.3 |

FOREIGN PATENT DOCUMENTS

| | | |
|---|---|---|
| 3307490 | 9/1984 | Fed. Rep. of Germany . |
| 5446173 | 4/1979 | Japan . |
| 1026201 | 4/1966 | United Kingdom . |
| 1314737 | 4/1973 | United Kingdom . |
| 2041231 | 9/1980 | United Kingdom . |

Primary Examiner—Richard V. Fisher
Assistant Examiner—Richard D. Jordan
Attorney, Agent, or Firm—Cushman, Darby & Cushman

[57] ABSTRACT

The apparatus for removing liquid films floating on liquids, in particular oil films floating on water, has a plurality of rotatably supported plates (3) which are driven for rotation around an axis (2) and which are immersed into the liquid level. The oil entrained by the surface of the plates (3) on emersion from the liquid level is stripped by means of strippers (4) and supplied to a collecting launder (5).

10 Claims, 5 Drawing Sheets

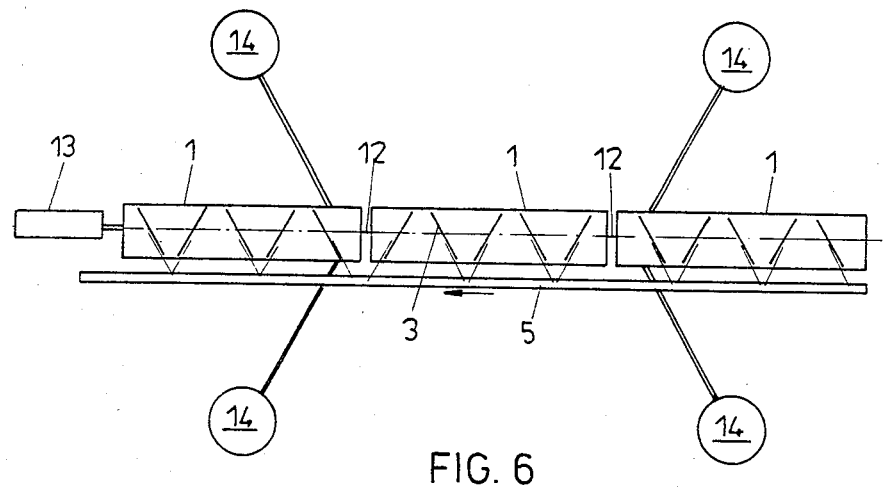
FIG. 6
FIG. 7
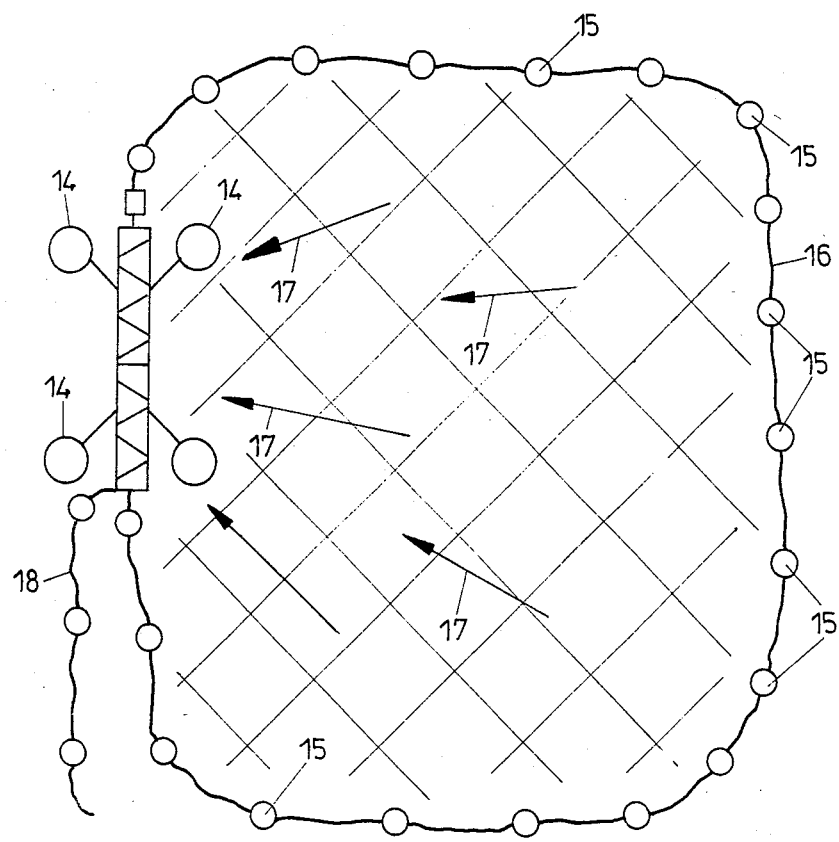

APPARATUS FOR SEPARATING OF LIQUID FILMS FLOATING ON LIQUIDS

BACKGROUND OF THE INVENTION

1. Field of the Invention

The invention refers to an apparatus for separating liquid films floating on liquids, in particular of oil films floating on water, comprising bodies being rotatably supported and being partially immersed into the liquid and comprising strippers arranged above the surface of the liquid.

2. Description of the Prior Art

Separating of oil films floating on water and having a thickness of some tenth up to several millimeters is extremely difficult in practice. It has already been proposed to separate oil films by means of pumps via suction nozzles from the liquid surface, which, however, suffers from the drawback that a substantial quantity of water is entrained. After the suction operation, there remain still substantial quantities of oil which must subsequently be bound by means of expensive oils binding agents and must most frequently be manually skimmed off. Oil recovered in this manner is most frequently unsuitable for being regenerated or being reused and must frequently be burnt in a supported combustion.

SUMMARY OF THE INVENTION

The invention now aims at providing a simple and inexpensive apparatus for reliably separating even relatively thin oil films. For solving this task, the apparatus according to the invention essentially consists in that a plurality of plates is interconnected for being rotated by means of an axis of rotation extending through said plates being inclined relative to said axis of rotation under an angle differing from 90° and in that the strippers are guided for engaging at least one surface of the plates. On account of a plurality of plates being immersed into the liquid phase and being rotatable by a drive means, the plates are, when being immersed, first superficially wetted by the floating phase. In case of an oil phase, there is formed, during the very first immersion, on the surface of the plates a thin oil film which tends on account of its hydrophobic properties to preferedly separate further oil and to entrain only a minor amount of water. As soon as the oil film present on the surface of the plates has accummulated to some degree, the oil film can in a simple manner be separated by strippers acting in a manner like wind shield wipers. In this case, it is preferred to lift the strippers off the plates and to press the strippers against the plates by an individual control means, so that a certain accummulation of oil film on the plates can be waited for prior to the stripping operation.

In an advantageous manner, the arrangement is such that adjacent plates are, as seen in at least one axial section, arranged with alternating opposite inclination relative to the axis of rotation. On account of this arrangement, the liquid surface between adjacent plates is alternately increased and reduced, noting that a correspondingly smaller surface results in a thicker oil film and thus in facilitating accummulation of the oil film on the plates. On account of the inclination of the plates, there results already the advantage that floating oil islets are alternatingly taken along at both sides of the plates in an easier manner than in case of vertically immersing plates because the inclination of the plates results in a movement of the plates which has as an effect a force or component of movement, respectively, acting in direction of the surface of the liquid. The oil islets are thus alternatingly shifted onto the plate. at the right-hand side and at the left-hand side of the plate, which equally substantially favourizes the separation. For the purpose of sufficiently wetting the individual plates and thus to reliably achieve a maximum accummulation also with small apparatuses, the plates are preferably supported for being immersed for at least one fourth, preferably for half of their diameter.

The individual plates may be formed of a material having a smooth surface, such as synthetic plastics material, glass high-grade steel or the like, noting that the apparatus is preferably designed for being operated with a rotating speed of approximately 15 to 30 rpm. On account of the gentle movement of the liquid surface, there results in this apparatus the advantage that even interrupted oil films are moved in a manner that the individual floating oil islets are moved to the plates and finally entrained by the plates.

Removal of the oil film can be effected by means of a collecting launder. For this purpose, the arrangement can in a simple manner be such that a collecting launder is arranged in essentially parallel relation to the axis of rotation and that the strippers are arranged with an inclination in direction to the collecting launder and extend till above the collecting launder. In a particularly simple manner, the collecting launder can be formed by the drive shaft for the plates itself. For this purpose it is preferred to design the collecting launder as a hollow shaft having supported thereon the plates. To make sure that, when discharging the oil film via the hollow shaft, only oil, but no water, is removed, the hollow shaft has radial perforations preferably located in proximity of the plates, noting that a stationary housing sealed relative to the hollow shaft and to the plates and surrounding the perforations of the hollow shaft is provided and that the strippers open into those entry openings of the housing which emerge from the liquid phase. Such a stationary housing further provides in a simple manner the possibility to stationarily support the strippers. The strippers may, in a simple manner, comprise wiper lips facing the surfaces of the plates and may be arranged for being resiliently pressed against the surfaces of the plates. If the stripping operation shall be performed only after a plurality of immersions and emersions of the plates, the strippers can, in a simple manner, be controlled such that the strippers are intermittently lifted off the surfaces of the plates and applied against the plates after predetermined time intervals.

The apparatus can, in a simple manner, be arranged within trough-shaped half-shells, noting that the plates are given such dimensions that they do not contact the inner wall of the half-shells when being rotated. When using the apparatus for separating oil films in wet docks or stationary floods, it is of advantage to mutually connect one with the other a plurality of such apparatuses, for which purpose the axis or shaft of rotation has at its free ends connecting pieces for connecting thereto a drive motor and/or further shafts.

The apparatus according to the invention is particularly suitable for separating floating oil films from settling tanks, pump sumps or the like, for example in production lines of the metal-working industry, where are collected lubrication oils, cooling oils or leakage oils from hydraulic systems. It is furthermore possible to separate oil from oil traps or oil separators in large garages, work shops, refineries and fuel tanks in a simple manner. When being used in stationary floods such as careening basins and wet docks, an oil barrier can equally be established in a simple manner when incorporating an apparatus according to the invention for separating the oil films.

BRIEF DESCRIPTION OF THE DRAWINGS

In the following the invention is further illustrated with reference to embodiments shown in the drawing.

In the drawing

FIG. 6 shows a schematic representation of a plurality of apparatuses connected one with the other for being incorporated in an oil barrier schematically shown in FIG. 7.

DETAILED DESCRIPTION OF THE PREFERRED EMBODIMENTS

Figure 1:
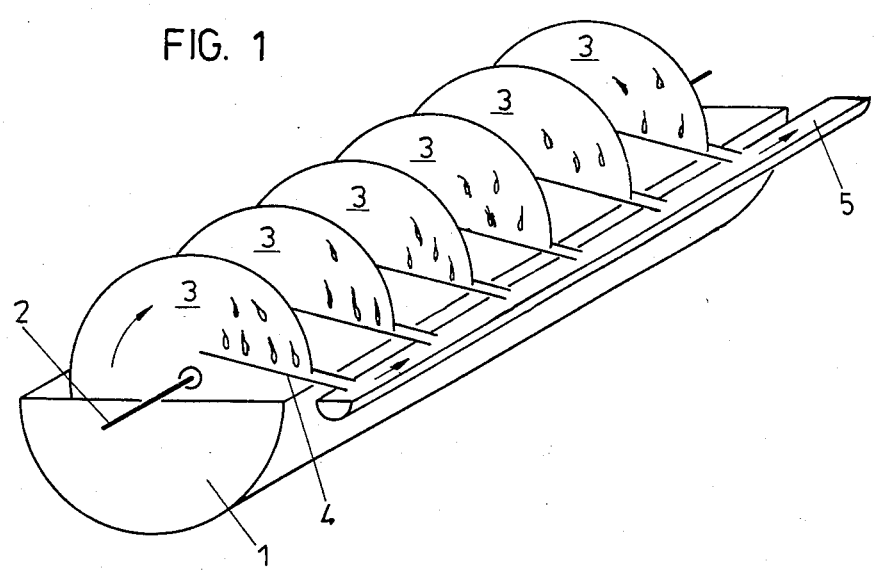
FIG. 1 is a perspective representation of a first embodiment of the apparatus according to the invention without a drive motor.

In FIG. 1 there is shown a basin 1 designed as a half-shell and having rotatably supported therein plates 3 for rotation around an axis 2. The plates 3 are immersed for somewhat less than half of their diameter into the liquid phase present within the basin 1 and having the film floating thereon. The film received and transported by the surfaces of the plates 3 is supplied to an oil collecting launder 5 by means of strippers 4.

Figure 2:
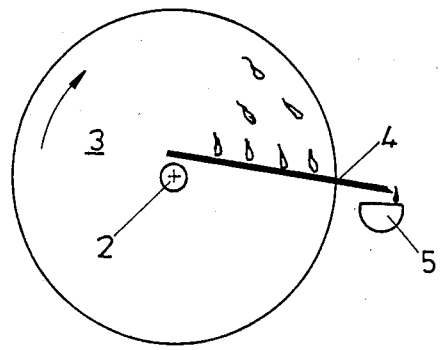
FIGS. 2 and 3 show in a schematic representation various arrangements of the strippers, FIGS. 4 and 5 give a schematic illustration of the action principle being the base of the separation.

The arrangement of the strippers shown in FIG. 1 is again shown in FIG. 2 as seen in axial direction. The oil film adhering to the surface of the plates 3 is passed by the strippers 4 to a collecting launder 5 extending in essentially parallel relation to the axis 2.

Figure 3:
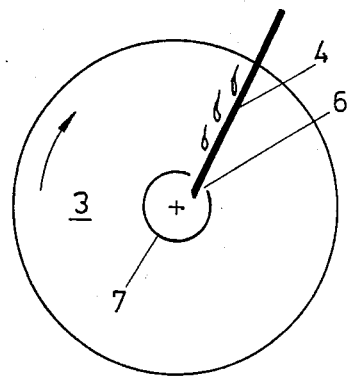

In the representation according to FIG. 3, removal of the oil film adhering to the surface of the plates 3 is effected by the wipers 4 in direction to a radial perforation 6 of a hollow shaft 7 forming the drive shaft for the plates. Discharge is thus effected in coaxial relation to the drive shaft.

Figure 4:
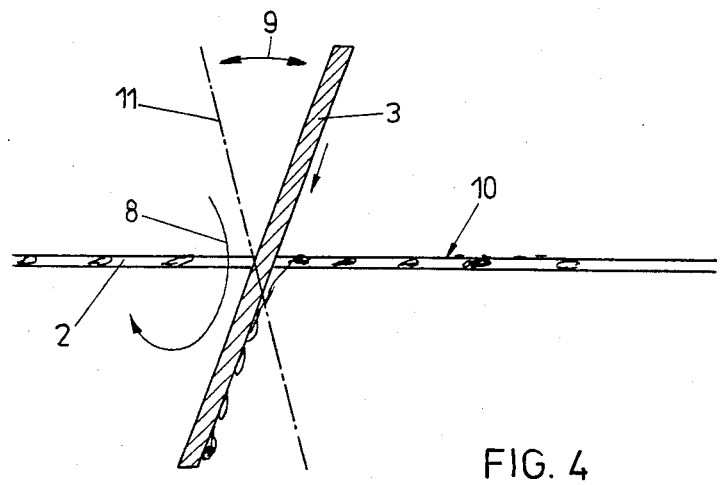

FIG. 4 illustrates that a plate 3 being inclined relative to the axis 2 of rotation alternatingly changes its inclination relative to the surface 10 of the oil film as indicated by the twin-arrow 9 when being rotated in direction of the arrow 8. The maximum deviation in opposite direction is schematically indicated by the dash-dotted line 11. During this movement, the oil film alternatingly arrives at the surface of the plates under different angles at both sides of the plates 3, noting that a minor shearing effort is effected onto the liquid surface and smallest oil islets are alternatingly entrained with greater ease at the right-hand side and the left-hand side of the plates than is the case with vertically immersed plates.

Figure 5:
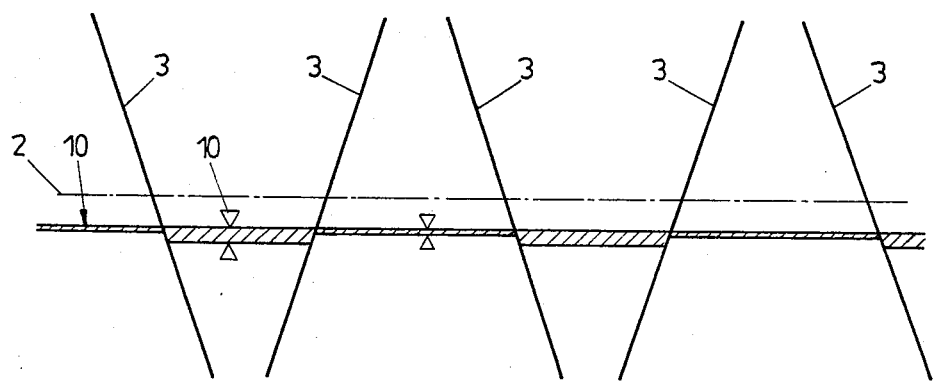

As results from the representation according to FIG. 5, also the surface of the liquid can permanently be varied in the areas between adjacent plates 3 which, as can be seen in an axial section, are alternately oppositely inclined relative to the axis 2 of rotation. A corresponding reduction in length of said surface results in an oil film, the thickness of which increases and which can more easily be picked up as the comparatively thinner surface film present in areas where the plates define a greater distance between adjacent plates. The oil film is again designated by 10 and its level is below the axis 2 of rotation in the representation according to FIG. 5.

By the representation according to FIGS. 6 and 7, the use of such apparatuses is illustrated for forming an oil barrier in stationary floods. In this schematic representation, the individual basins 1 have the shape of half-shells and are connected one with the other by coupling members 12, noting that the drive motor is provided only at one end and is designated by 13. The collecting launder for the separated oil may continuously extend over the whole length of the apparatuses arranged in series and is again schematically indicated by 5. The individual trough-shaped half-shells 1 have connected to their outer side floats 14, which provides the possibility of incorporating said apparatuses into an oil barrier such as is shown schematically in FIG. 7.

In the representation according to FIG. 7, a plurality of apparatuses according to FIG. 6 are incorporated as part of an oil barrier. The oil barrier consists of straps 16 provided with floats 15, the apparatus for separating the oil film being interconnected into said strap 16. With proceeding separation, whereby the oil film is removed in direction of the arrows 17, the strap can be tightened, which results in a more or less long loose end 18, until the oil film is confined to such an extent that it can be separated as a whole.

Figure 8:
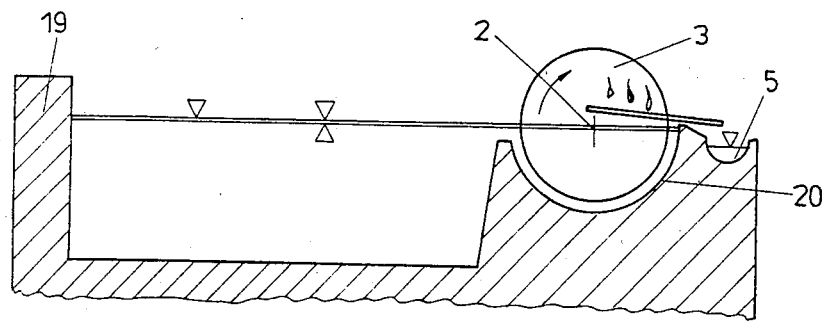
FIG. 8 shows a stationary installation for being used in connection with pump sumps, oil separators or settling tanks, FIG. 9 schematically shows the stripping action and removal of the stripped oil

FIG. 8 shows an alternative arrangement of the apparatus according to the invention as a stationary installation. The plates 3 rotate again around an axis 2, the plates being immersed into a trough-shaped basin 20 attached to a settling basin 19. The separated oil is again discharged into a collecting launder 5.

Figure 9:
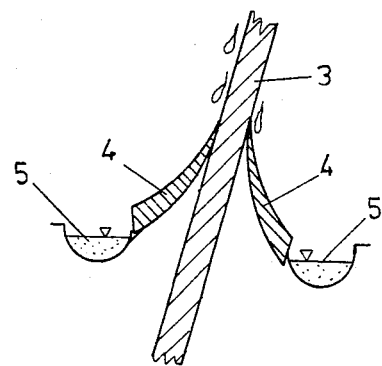

In the representation according to FIG. 9, there is schematically indicated the arrangement of strippers 4 at both sides of a plate 3. Both strippers are designed such that the material picked up by the strippers 4 is fed to the collecting launders 5 via the surface of the strippers.

Figure 10:
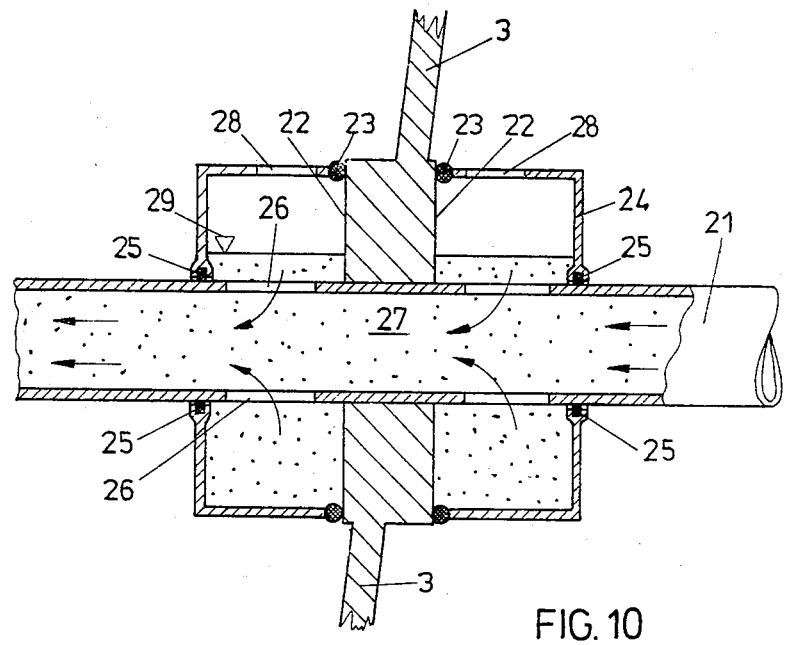
FIGS. 10 and 11 show an embodiment of the discharge means for the separated oil, thereby using a hollow drive shaft for the plates.
Figure 11:
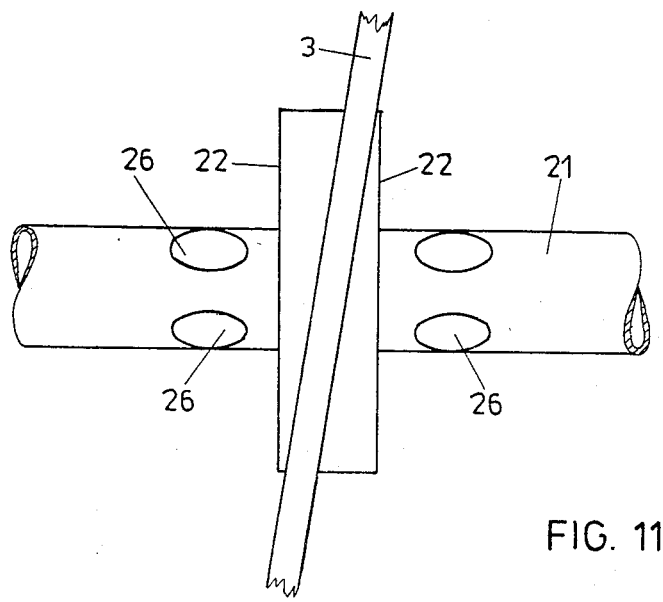

In FIGS. 10 and 11, there is shown a modified way for removing the separated oil, noting that a hollow shaft 21 is used in place of a laterally arranged collecting launder 5. The plates 3 are supported on this hollow shaft 21 being connected with a rotation drive means, noting that the plates are, for simplifying the sealing problems, connected to the hollow shaft 21 under an angle of 90° in a first radial partial area. In this manner, surfaces 22 are formed which remain in the same cross sectional plane during rotation and can cooperate in a simple manner with sealings 23. The sealings 23 are provided on a stationary, non-rotatably supported housing 24. The housing 24 is sealingly connected to the hollow shaft via sealings 25 and carries, in a manner not shown in detail, the strippers for the plates 3. The hollow shaft 21 has radial perforations 26 via which the separated oil can enter the interior 27 of the hollow shaft, so that the oil can be discharged through the hollow shaft 21. For this purpose, the housing 24 has at its upper side openings 28 being stationary together with the housing, the stripped oil film being fed into these openings by the strippers.

In the representation according to FIG. 11, the hollow shaft is, together with the plates 3 mounted thereon, shown in a top plan view with omission of the housing 24. The sealings forming the seal rings 22 and 25 can be simple O-rings. The oil entering bores of the hollow shaft may be distributed over the circumference of the hollow shaft 21, and a collecting space for the stripped oil can, as is shown in FIG. 10, be formed within the housing 24, so that the oil is discharged into this collecting space under the action of the hydrostatic pressure. The oil level within the interior of the housing 24 is designated by 29 in FIG. 10.

What is claimed is:

1. Apparatus for separating a liquid film floating on the surface of a liquid, comprising:
    plate means for removing said liquid film from said liquid surface being rotatably supported and being partially immersed into said liquid;
    stripper means for removing said film from said plate means arranged above the surface of said liquid;
    and shaft means for rotating said plate means about an axis of rotation extending through said plate means, said plate means being attached to said shaft means and inclined relative to the surface of said liquid at an angle differing from 90° such that rotation of said shaft means causes the surfaces of said plate means to alternately change their inclination during rotation causing a shifting action in said liquid surface such that said liquid film is urged towards and adheres to the surfaces of said plate means;
    said stripper means being guided for engaging at least one surface of said plate means and removing said film from said plate means.

2. Apparatus as claimed in claim 1, further comprising adjacent plate means arranged with alternating opposite inclinations relative to said axis of rotation.

3. Apparatus as claimed in claim 1, wherein said plate means are circular and are supported for being immersed into said liquid for at least one fourth to one half of their diameter.

4. Apparatus as claimed in claim 1, further comprising, a collecting launderer arranged in substantially parallel relation to said axis of rotation and wherein said stripper means are arranged with an inclination in a direction to the collecting launderer and extend above the collecting launderer, such that said stripper means remove said liquid film from said plates and pass said film to said launderer.

5. Apparatus as claimed in claim 4, wherein said collecting launderer comprises a hollow shaft on which said plate means are supported.

6. Apparatus as claimed in claim 1, wherein; said stripper means comprise wiper lips facing the surfaces of said plate means and are arranged for being resiliently pressed against the surfaces of said plate means.

7. Apparatus as claimed in claim 1, wherein
    said shaft includes a free end carrying a coupling member connected to a further plate-carrying shaft.

8. Apparatus as claimed in claim 7, wherein;
    said shafts are bearingly supported in trough-shaped half-shells.

9. Apparatus for separating a liquid film floating on the surface of a liquid, comprising:
    plate means for removing said liquid film from said liquid surface being rotatably supported and being partially immersed into said liquid;
    stripper means for removing said film from said plate means arranged above the surface of said liquid;
    shaft means for rotating said plate means about an axis of rotation extending through said plate means, said plate means being attached to said shaft means and inclined relative to the surface of said liquid at an angle differing from 90° such that rotation of said shaft means causes the surfaces of said plate means to alternately change their inclination during rotation causing a shifting action in said liquid surface such that said liquid film is urged towards and adheres to the surfaces of said plate means;
    said stripper means being guided for engaging at least one surface of said plate means and removing said film from said plate means, wherein;
    a collecting launderer is arranged in substantially parallel relation to said axis of rotation which launderer comprises a hollow shaft on which said plate means are supported wherein;
    said hollow shaft has radial perforations in proximity of said plate means, in that a stationary housing, which is sealed relative to said hollow shaft and said plate means, encloses the perforations of said hollow shaft and said stripper means open into entry openings of the housing which emerge from the liquid.

10. Apparatus as claimed in claim 9, wherein;
    said stripper means are supported on said hollow shaft in the stationary housing.

* * * * *